Figure 1:
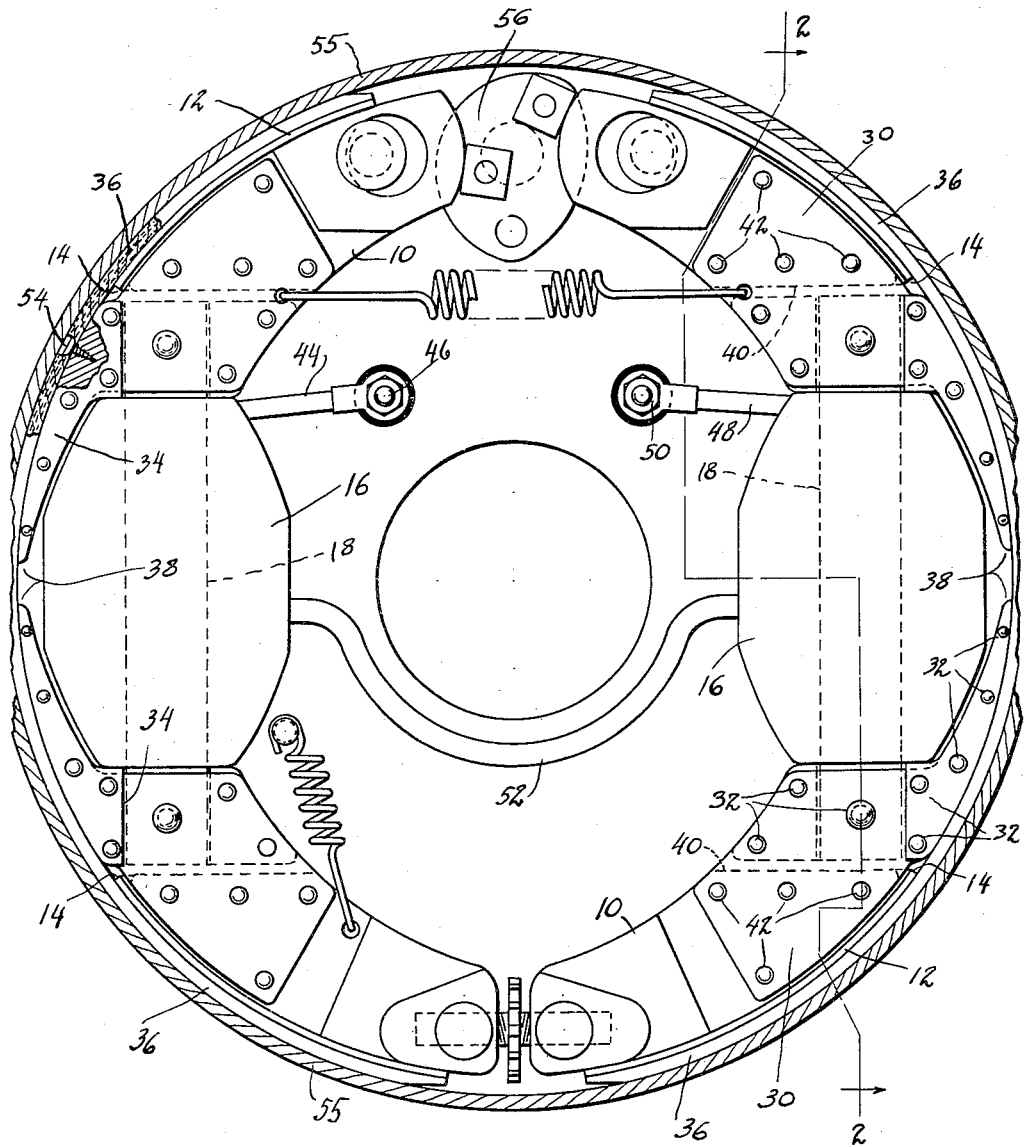

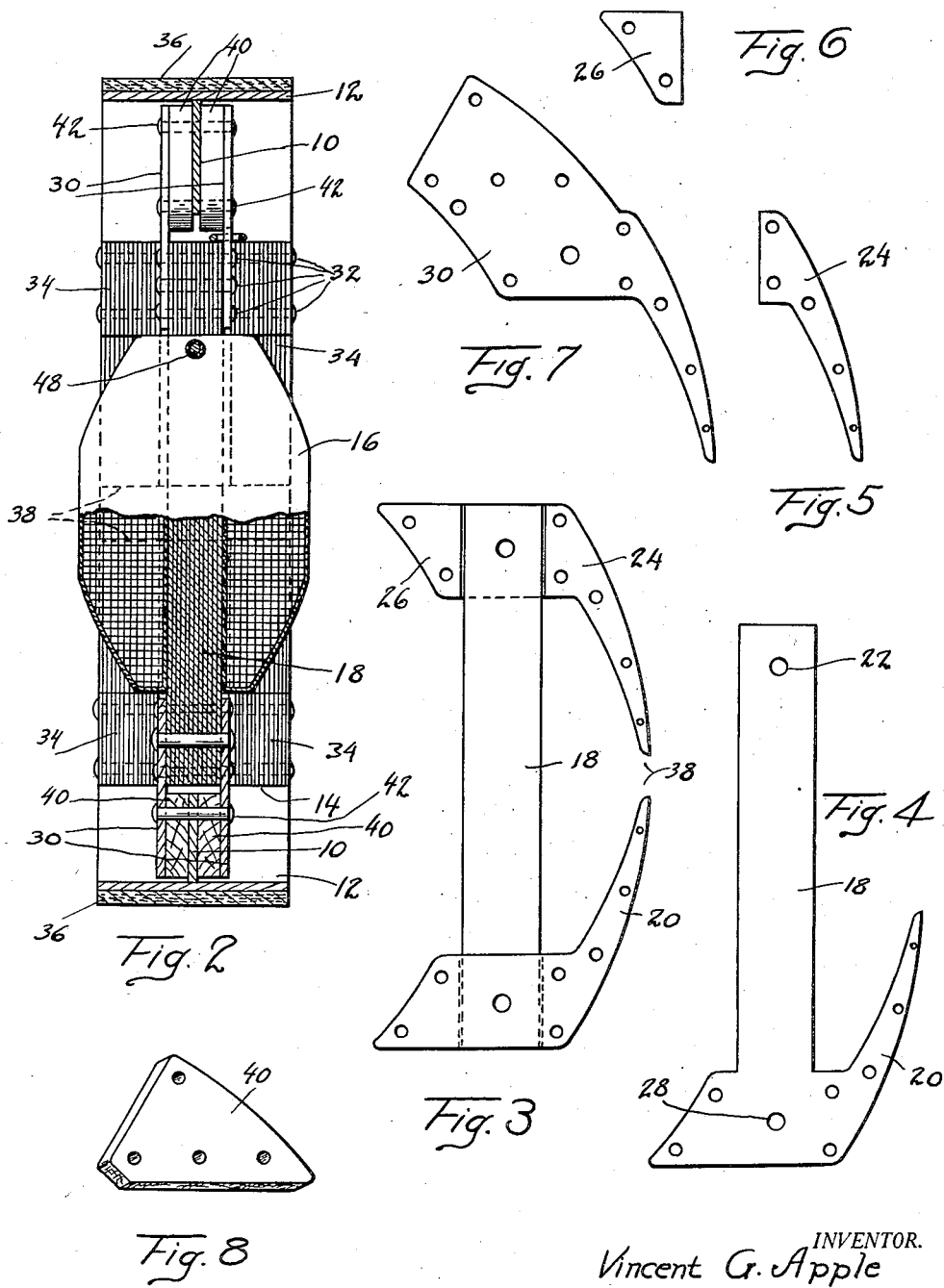

Patented Dec. 4, 1934

1,983,332

UNITED STATES PATENT OFFICE 1,983,332

MAGNETIC DUO-SERVO BRAKE

Vincent G. Apple, Dayton, Ohio, assignor to Bendix Brake Company, South Bend, Ind., a corporation of Illinois Application January 23, 1930, Serial No. 422,751

14 Claims. (Cl. 188—164)

My invention relates to brakes and has particular reference to automotive vehicle brakes.

An object of my invention is to assemble and render more efficient brake mechanism of the character described through the employment of improved electromagnetic structure, combined and coordinated therewith in an improved manner.

Another object of my invention is to provide a brake friction member which includes an electro-magnet of an improved type which may be energized at will by the operator for the purpose of urging the friction member against the rotating member of the brake assembly.

Another meritorious feature comprises embodying my improved structure in servo brake mechanism, particularly of the floating type having one point which anchors when the drum is rotating in one direction and another point that anchors when the drum is rotating in the reverse direction, as well as providing different parts which serve as servo parts depending upon the direction of drum rotation.

A feature of importance includes building up an improved brake friction element which has an improved electro-magnet arranged in an improved fashion as a component part thereof; and particularly wherein the electro-magnet serves to support, in part at least, the friction facing material carried by the brake friction part.

Other objects and advantages of my improved brake mechanism will more fully appear from the following description, appended claims accompanying drawings wherein:

Fig. 1 is an elevation of my brake shoe assembly, the brake drum being shown in section, Fig. 2 is a sectional view on the line 2—2 of Fig. 1 omitting the brake drum, Fig. 3 shows the various lamini, which form the core, assembled, Figs. 4 to 7, inclusive, illustrate various stampings from which my brake shoe structure is constructed, and Fig. 8 is a perspective of one of the filler blocks.

In Fig. 1 the numeral 10 represents the conventional web of the brake shoe to which is welded the steel band 12. The structure at each end of each of the two brake shoes is identical and in each instance both the band and the web end at the portion indicated by the numeral 14.

Each of the two brake shoes embodies a magnet which is built up from cores of lamination iron made up as illustrated. Each of the laminations disclosed in Fig. 4 is composed of a core portion 18, and a curved end portion which has been indicated by the numeral 20. At the extremity of the core which is opposite the curved portion 20 there is a rivet hole 22. These laminations are stacked in such a way that every other lamination has its headed portion, or that portion which bears the curved end 20, at opposite ends of the assembly (see Fig. 3). For this reason there will be a gap between each alternate headed portion of the core laminations. Each of these gaps is filled by the filler laminations 24 and the filler laminations 26, which are located on opposite sides of the core member 18.

A rivet hole 28 is provided in the curved portion 20 of each core lamination, and this entire core assembly as just described is riveted together between the brass plates 30 (see Fig. 2) by means of the rivets 32. Brass plates have been specified, but it is simply necessasry that these plates be composed of some non-magnetic material.

A second group of laminations 34 are stacked on each side of the core assembly, at each end thereof, for the purpose of filling out a continuous surface which will function to support the brake lining material 36. These laminations 34 are the same as laminations 24, in every respect, but are located on the outside of the brass stampings 30.

An entire assembly, consisting of the laminations 18, 24, and 26, as well as the brass stampings 30 are stacked as clearly illustrated in Figs. 2 and 3 and the rivets 32 slipped into place. The coil 16 is then slipped over the core portion of the assembled laminations 18 and the alternately spaced cores of a duplicate are slipped between one another, after which rivets are inserted in the rivet holes 22 and 28, which completes the assembling of the unit.

Upon such completion a small gap 38 will exist between the tips of the curved portions 20 and 24, thus providing some degree of flexibility in the brake lining at this particular point.

Two filler blocks 40 of nonmagnetic fibrous material, illustrated in detail in Fig. 8, are then inserted between plates 30, enclosing the web 10 between them. This assembly is then riveted together by means of the rivets 42 to complete the shoe structure.

A cable 44 extends from one end of one coil 16 to a binding post 46 and a second cable 48 is similarly attached to a binding post 50 associated with the other coil 16. A third cable 52 extends from one end of one coil 16 to the opposite end of the other coil 16.

By utilizing the brass plates 30 magnetism from the core laminations is prevented from travelling to the shoe webs 10, and in this way "shorting" across the anchor points. When the coils 16 are energized there is a magnetic pull between the curved portions 20 and the brake drum 55.

Drive screws 54 are utilized for the purpose of holding the lining to the laminations and conventional rivets function to secure the lining to the steel bands 14. These screws 54 are driven into holes drilled in the laminations after the said laminations have been assembled.

My improved electro-magnetic brake structure is shown here as embodied in a brake having a floating friction means here illustrated as consisting of a pair of interconnected brake shoes, operable to anchor at either end, depending upon the direction of drum rotation. I have also provided a pair of servo parts each operable to operate the other part of the friction means against the drum, depending entirely upon the direction of drum rotation.

For the purpose of providing a safety feature for use in the event that the electro-magnet in either of the shoes fail to operate, or in case the electrical energy from the storage battery was unavailable consisting in the ordinary cam operated expanding means generally indicated by the numeral 56 in Fig. 1. This camming means may be operated in a conventional manner through any desirable mechanical linkage.

The two shoes are supported in floating relation to the rotating drum and are adapted to anchor against either of the conventional anchor pins clearly illustrated in Fig. 1, depending entirely upon the direction of rotation of the drum 55. The drum functions as the armature of the electromagnet coil to draw the shoes into contact with the drum, whereupon the floating shoes tend to wrap in one direction or another and anchor.

Each brake shoe here shown acts as a servo shoe upon the other brake shoe, depending upon the direction of drum travel. Each shoe is adapted to anchor and the other shoe is forced against the drum by the manually operable cam. The manual mechanical cam applying structure is that of the conventional duo-servo commercial designs. Each shoe is not only operable into engagement with the drum through the manual operation of the cam but is also adapted to be urged against the drum magnetically to augment its own retarding effect and also its servo effect.

Having described a preferred embodiment of my device, other modifications may be apparent to those skilled in the art and for that reason I intend to limit myself only within the scope of the appended claims.

1. In brake mechanism, a brake friction member comprising a plurality of laminations forming an electro-magnet core and a friction surface positioned thereby.

2. Brake mechanism including, in combination, a rotatable member, and retarding means therefor comprising a plurality of laminations built up to form an electro-magnet and a friction surface positioned thereby.

3. Brake mechanism comprising, in combination, a brake drum, an electro-magnet within the drum having a core and an outer convexly curved periphery conforming to the periphery of said drum, a coil mounted on said core, and friction facing supported by said outer curved periphery.

4. In brake mechanism, a retarding member having a friction facing supporting surface and including an electro-magnet portion having a part serving as an extension of said friction facing supporting surface.

5. In brake mechanism, a retarding member having a friction facing supporting surface including an electro-magnet portion having a part serving as an extension of said friction facing supporting surface and a friction facing carried by said supporting surface of the retarding member and said electro-magnetic portion thereof.

6. In brake mechanism, retarding means having a plurality of friction facing supporting surfaces and including an electro-magnetic portion having a part arranged between said friction facing supporting surfaces to partially support the friction facing material carried thereby.

7. In brake mechanism, a retarding member having an electro-magnetic structure arranged between a pair of end portions and having friction facing material extending across said end portions and the intervening space occupied by said electro-magnetic structure.

8. An arcuate brake shoe comprising a friction member built up of a plurality of laminations of magnetizable material, certain of said laminations providing a recess extending outwardly from the inside of said arc and including a magnetic core extending longitudinally across said recess, and a magnetic coil positioned about said core.

9. A retarding member comprising spaced rigid arcuate end portions, an electro-magnet interpositioned therebetween and secured thereto, and filler members secured to and continuing the arc of said end portions in overlapping relation to said magnet.

10. A retarding member comprising spaced rigid arcuate end portions, an electro-magnet interpositioned therebetween and secured thereto, and magnetizable filler members secured to and continuing the arc of said end portions in overlapping relation to said magnet.

11. A retarding shoe comprising spaced rigid arcuate end portions, an electro-magnet interpositioned therebetween and secured thereto, filler members secured to and continuing the arc of said end portions in overlapping relation to said magnet, the inner adjacent ends of said filler members being spaced slightly, and a friction lining extending over the outer arcuate surface of said shoe and secured thereto.

12. Brake mechanism comprising a rotatable drum, arcuate friction shoes supported therein and adapted to be expanded into engagement with said drum, each of said shoes including an electro-magnet having its longitudinal axis lying on a chord of an arc of said friction shoes.

13. In brake mechanism, a rotatable drum, an internal expanding friction member engageable with said drum and comprising a plurality of laminations forming an electro-magnetic core, and a friction surface on said member for contacting with said drum.

14. A brake mechanism, comprising, in combination, a rotatable drum, an arcuate shoe disposed adjacent the drum and engageable therewith, means for establishing a magnetic circuit through a portion of said shoe and including the drum to attract said shoe into engagement with the drum, and non-magnetic material between said portion of the shoe and the remainder thereof to insulate the latter from the magnetic circuit.

VINCENT G. APPLE.